Feb. 12, 1929.  A. E. SPINASSE  1,701,899
PROCESS AND APPARATUS FOR DRAWING GLASS
Filed Aug. 28, 1926   2 Sheets-Sheet 1
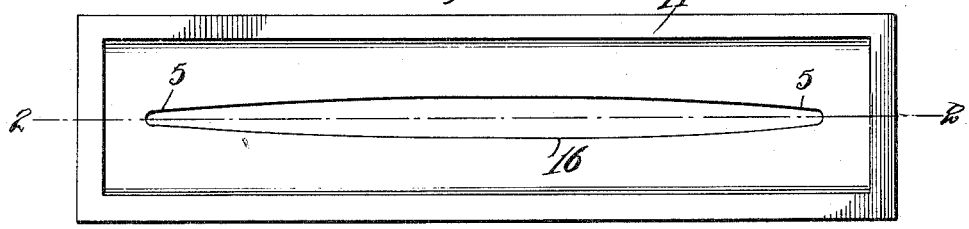
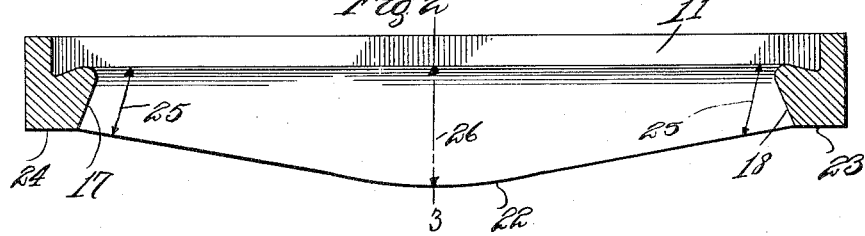
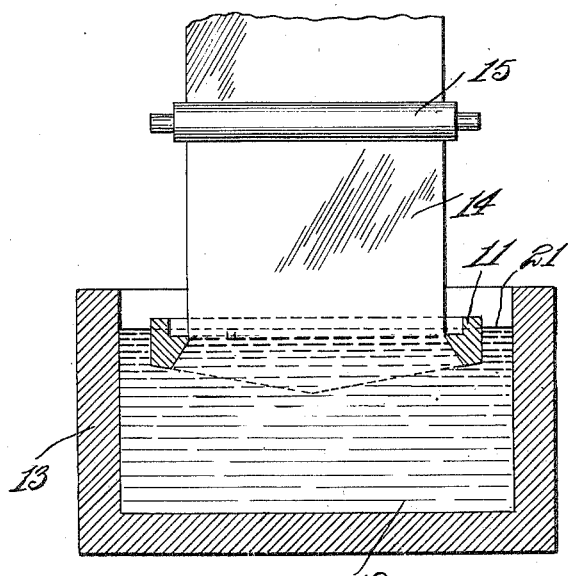
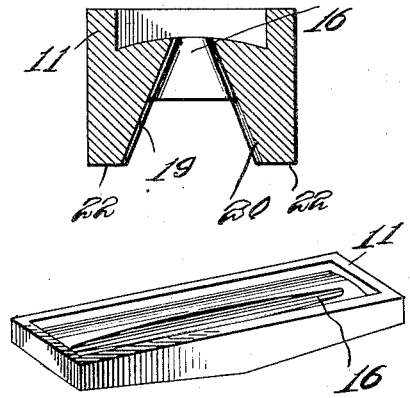
Inventor
Arthur E. Spinasse Feb. 12, 1929.
A. E. SPINASSE
1,701,899
PROCESS AND APPARATUS FOR DRAWING GLASS
Filed Aug. 28, 1926     2 Sheets-Sheet 2
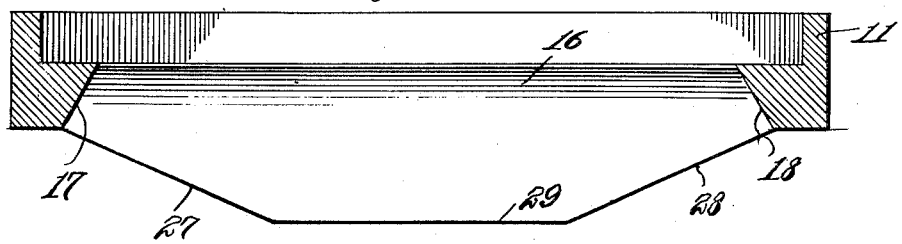
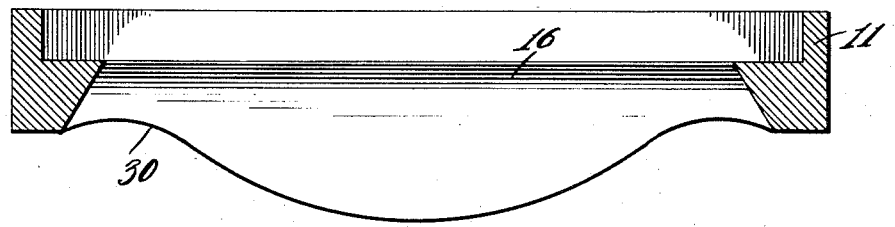
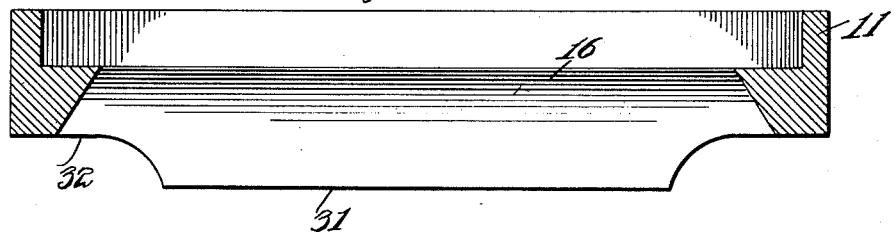
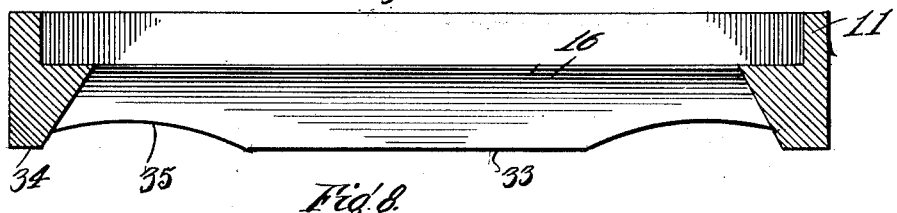
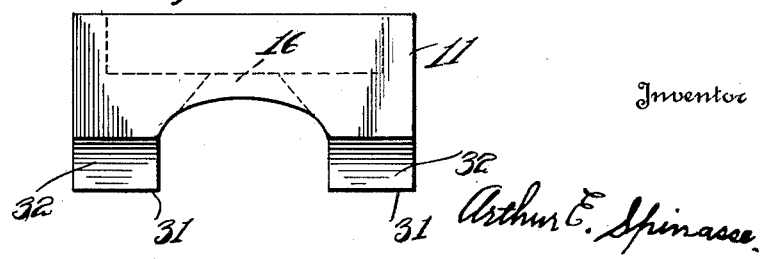
Inventor
Arthur E. Spinasse Patented Feb. 12, 1929.

1,701,899

UNITED STATES PATENT OFFICE.

ARTHUR E. SPINASSE, OF MOUNT VERNON, OHIO.

PROCESS AND APPARATUS FOR DRAWING GLASS.

Application filed August 28, 1926. Serial No. 132,245.

The present invention relates to improvements in process and apparatus for drawing glass and more particularly refers to an improved float or die adapted to be placed in the glass bath and through which the glass sheets or other articles are drawn.

An object of the invention is to provide an improved float or die in which provision is made for compensating as to the differences in temperature of the molten glass in various parts of the bath to the end that a better and more uniform sheet of glass may be produced.

With the foregoing and other objects in view, the invention will be more fully described hereinafter, and will be more particularly pointed out in the claims appended hereto.

In the drawings, wherein like symbols refer to like or corresponding parts throughout the several views, Figure 1 is a top plan view of a glass drawing device constructed according to the present invention.

Figure 2 is a longitudinal section taken therethrough on the line 2—2 in Figure 1.

Figure 3 is a cross section taken on the line 3—3 in Figure 2.

Figure 4 is a vertical section taken through a glass tank and showing in longitudinal section a slightly modified form of device with the glass sheet shown as drawn therefrom.

Figures 5, 6 and 7 are longitudinal central sections showing modified constructions.

Figure 8 is an end view of the device shown in Figure 7.

Figure 9 is also a longitudinal central section of a further modification, and

Figure 10 is a perspective view of the device.

Referring more particularly to the drawings, 11 designates generally a float or die of refractory or other material adapted to be placed in the glass bath 12, as indicated in Figure 4, in which 13 designates the tank or glass receptacle, 14 the sheet or other glass article drawn upwardly from the bath through the float or die and 15 represents the drawing rollers.

This float or die 11 is formed with the vertical slot 16 of greater width in the central portion than at the ends as will be clear from Figure 1, and having the vertically inclined end walls 17 and 18, as seen in Figure 2, and the upwardly converging longitudinal walls 19 and 20, as best shown in Figure 3. The level of the glass is indicated at 21 in Figure 4 and the device is intended to be placed in the glass below this surface level, so that the slotted portion is below said level. This causes the glass to be forced upwardly through the slot by hydrostatic pressure and the glass is then drawn upwardly from the upper portion of the slot between the rollers 15.

The float or die is modified according to the present invention by the construction of the lower portion or walls thereof, whereby to feed the glass from different depths in the pool at different places.

As shown in Figure 2, the side walls are curved as indicated at 22, so that these walls dip into the glass at greater depth in the hotter portions of the bath and at lesser depth in the cooler portions of the glass. The adjacent walls 13 of the furnace has a tendency to cool more than the molten glass in the center of the furnace. The supplying slot 16 is also narrower at its ends causing greater cooling of the glass at this point. The glass is also hotter near the top and cooler or of less fluidity near the bottom of the tank.

The invention therefore aims to so arrange and construct the walls of the device as to cause the portions of the walls at 23 and 24 to project at lesser depth in the bath, while the center portion as at 22 projects down to a greater depth to compensate for the variation in temperature. The result is that glass of uniform temperature is supplied to the slot at uniform temperature throughout, which enables me to produce a better sheet of glass. For instance if the portions 25 are 4 inches in depth, the portions 26 at the center will be from 6 to 8 inches in depth. Of course, this depth may be varied at will.

In Figure 2, the lower edge 22 is shown as curved downwardly from the ends toward the central lowest point, but in Figure 5 the walls 27 and 28 are shown as inclined downwardly to meet the ends of the lower straight edge 29.

In Figure 6 the device is modified to show inverse curves 30 at the end portions and in Figures 7 and 8 the lower edges 31 of the walls are straight or horizontal, while the end portions are upwardly offset or cut away as indicated at 32.

In Figure 9 the bottom central portion 33 is at substantially the same depth in the glass as the end wall portions 34, while upwardly offset or cut out intermediate portions 35 are provided to extend to a higher depth to compensate for greater cooling at such points.

In the use of the device the glass is drawn upwardly through the slot 16 from the glass in the bath beneath the surface and due to the variation in depth of the walls, the glass received in the slot will be all of substantially the same temperature, so that a sheet of uniform character may be drawn.

While I may obtain substantially uniform temperature of the glass at the drawing source, with my present invention, I may also obtain any desired drawing temperature of the glass at any desired points. If a decrease in temperature is desired at any particular points at the drawing source, the depth of penetration of the walls of the slot is decreased at, or adjacent to, such places. At times, this is important; for example, in drawing sheets of glass by the Fourcault process, the edge or border portions of the sheet will be drawn from the glass supplied to the narrow end portions 5—5 of the slot 16, Figure 1. The thickness of the drawn edge portions of the sheet is dependent upon the width of the narrowed slot portions. However in the Fourcault process, beaded edges of greater thickness than that of the main body portion of the sheet are produced during drawing. Further reducing of the width of the end portions of the slot causes abnormal cooling of the glass and tends to create defective draw. With my present invention it will be clear that I may further reduce the width of the end portions of the slot, to thereby thin the drawn edges to desired reduced thickness, while at the same time avoiding undue cooling of the glass in the narrowed portions of the slot by proportionately reducing the depth of penetration of the end portions of the slot as above described.

In practice the glass bath beneath the slot member is kept at about 1900 degrees F., and in accordance with my invention, in practice the operator observes the effect or result obtained with a test slot member and will gradually reduce both the width and depth of the end portions of the slot until the desired thickness in the edges and temperature of the glass at the edges of the drawn sheet is obtained. I am thus enabled to produce edge or border portions in the drawn sheet of desired reduced thickness and good temper. I may thus produce beaded edges greatly reduced in thickness, and may even produce edges in the sheet of substantially the same thickness as that of the body portion of the drawn sheet without undue cooling of the glass at the restricted end portions of the slot. Inferior quality of glass and much waste in strip glass oftentimes result due to excess cooling of the glass at the margin portions of the sheet and much saving can be effected by the use of my present invention.

It is obvious that various changes and modifications may be made in the details of construction and design of the above specifically described embodiment of this invention without departing from the spirit thereof, such changes and modifications being restricted only by the scope of the following claims.

What is claimed is:—

1. The process of drawing flat sheet glass by flowing glass into a shaping slot from different levels at different points, flowing said glass upwardly through said shaping slot, and simultaneously drawing said glass in flat sheet form.

2. A supplying float having substantially parallel spaced walls which project to a lesser depth in the glass bath from the central portion thereof to the end portions of said supplying float.

3. A supplying float having substantially parallel spacing walls which project to greater depth in the hot portions of the bath and to lesser depths to the cooler portions of the bath.

4. A supplying float or die piece for the manufacture of flat sheet glass comprising a refractory body having a slot therein through which the glass passes, the walls of the slot transversely of the sheet projecting at different depths in the bath at different points to compensate for variations in temperature in the glass at the source of the drawn sheet.

5. A slotted glass drawing device adapted to be immersed in a bath of glass and having the lower portions thereof formed irregularly to reach down into different depths of the glass bath whereby to feed to said slotted portion glass at the same temperature from different depths of the bath.

6. In apparatus for drawing sheet glass, a slot member for supplying glass to the base of the drawn sheet, the walls of said slot projecting at different depths at different points in the glass bath.

7. In apparatus for drawing sheet glass, a slot member for supplying glass to the base of the drawn sheet, the walls of said slot projecting at different depths at different points in the glass bath, the portions of the slot adjacent the points where the edges of the sheet are drawn being of less cross sectional area than that of the portion of the slot from which the intermediate portion of the sheet is being drawn.

8. In apparatus for drawing sheet glass from a bath of molten glass, a slot member for supplying glass to the base of the drawn sheet, the upper portion of the slot varying in width from its central portion to the end portions thereof and the walls of said slot projecting at varying depth in the glass bath.

9. The process of drawing sheet glass from a bath of molten glass, by flowing glass upwardly through a slot and drawing said glass in flat sheet form, restricting the glass passing through the end portions of the slot where the edge and border portions of the sheet are drawn, and supplying glass to the end portions of the slot from higher levels in the bath than to the intermediate portion of the slot where the main body portion of the sheet is being drawn.

10. The process of drawing sheet glass from a bath of molten glass, by flowing glass upwardly through a slot and drawing said glass in flat sheet form, restricting the glass passing through the end portions of the slot to thin down the drawn edges of the sheet while at the same time compensating for the greater cooling influences at the restricted portions of the glass by supplying glass in proportionately adjusted higher temperature at such points than at the center.

11. The process of drawing flat sheet glass from a bath of molten glass which consists in supplying glass to an immersed sheet forming refractory body co-extensive with the base of the sheet and from a greater depth at the middle portion of the body than at the end portions thereof.

12. The process of drawing flat sheet glass from a bath of molten glass which consists in immersing a slotted refractory body in the bath, drawing the sheet from the glass of the bath in line with the slot in said refractory body and causing glass from the bath to pass through the slot to the base of the sheet from a greater depth in the middle portion of the slot than at the end portions thereof.

13. In apparatus for drawing flat sheet glass from a bath of molten glass, an oblong sheet-forming refractory device adapted to be immersed in the bath in line with the base of the sheet glass being drawn, the walls of said refractory device projecting to different depths at different points in the glass bath.

14. In apparatus for drawing sheet glass from a bath of molten glass, a slotted refractory member of greater length than breadth adapted to be immersed in the bath in line with the base of the sheet glass being drawn, the walls of said member progressively extending to a lesser depth in the glass bath from its center to the end portions thereof.

15. In apparatus for drawing sheet glass from a bath of molten glass, a receptacle for containing a bath of molten glass, a relatively long narrow refractory body adapted to be immersed in the glass bath with the end portions thereof adjacent the opposite walls of said receptacle, said refractory body having a slot therein extending substantially throughout the length thereof and coextensive with the sheet being drawn, means for drawing the sheet from the glass in line with the slot, said refractory body extending to a greater depth in the bath in its middle portion than at the ends thereof.

In testimony whereof I affix my signature.

ARTHUR E. SPINASSE.